United States Patent
Kim et al.

(10) Patent No.: US 7,808,553 B2
(45) Date of Patent: Oct. 5, 2010

(54) APPARATUS AND METHOD FOR CONVERTING INTERLACED IMAGE INTO PROGRESSIVE IMAGE

(75) Inventors: Hye Yun Kim, Yongin-si (KR); Hyun Mun Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1430 days.

(21) Appl. No.: 10/961,478

(22) Filed: Oct. 12, 2004

(65) Prior Publication Data

US 2007/0229534 A1    Oct. 4, 2007

Related U.S. Application Data

(60) Provisional application No. 60/604,463, filed on Aug. 26, 2004.

(51) Int. Cl.
*H04N 7/01* (2006.01)
*H04N 11/20* (2006.01)
*H04N 11/22* (2006.01)
*H04N 5/14* (2006.01)
*H04N 9/64* (2006.01)

(52) U.S. Cl. .................. 348/452; 348/448; 348/449; 348/458; 348/700

(58) Field of Classification Search ............. 348/448, 348/449, 451, 452, 458, 700, 701; 382/260, 382/266, 300
See application file for complete search history.

(56) References Cited

U.S. PATENT DOCUMENTS

| | | | |
|---|---|---|---|
| 5,081,532 A | 1/1992 | Rabii | |
| 5,532,751 A | 7/1996 | Lui | |
| 5,534,935 A * | 7/1996 | Kawai et al. | 348/448 |
| 5,661,525 A * | 8/1997 | Kovacevic et al. | 348/452 |
| 5,796,437 A | 8/1998 | Muraji et al. | |
| 5,822,008 A * | 10/1998 | Inoue et al. | 348/446 |
| 5,825,429 A * | 10/1998 | Shirahata | 348/448 |
| 5,936,676 A | 8/1999 | Ledinh et al. | |
| 6,097,847 A * | 8/2000 | Inoue | 382/266 |
| 6,122,017 A * | 9/2000 | Taubman | 348/620 |
| 6,181,382 B1 * | 1/2001 | Kieu et al. | 348/459 |
| 6,381,279 B1 * | 4/2002 | Taubman | 375/240.18 |
| 6,396,876 B1 * | 5/2002 | Babonneau et al. | 375/240.29 |

(Continued)

OTHER PUBLICATIONS

European Search Report mailed Aug. 1, 2008 issued with respect to the corresponding European Patent Application No. 04255971.1-1522.

*Primary Examiner*—Brian P Yenke
(74) *Attorney, Agent, or Firm*—Staas & Halsey LLP

(57) ABSTRACT

An apparatus and method for converting an interlaced image into a progressive image, the apparatus includes a motion detector which detects motion at an object pixel of the interlaced field image, using proceeding and following field images; an interpolation direction determination unit which determines a direction in which the object pixel is to be interpolated, using values of pixels along scan lines where the object pixel is not located when motion at the object pixel is detected; a first interpolator which spatially interpolates the object pixel according to the determined direction; and a second interpolator which resets a value of the object pixel using corresponding values of pixels of the preceding and following field images and a value obtained by spatially interpolating the object pixel when the object pixel contains high-frequency components in the vertical direction.

31 Claims, 14 Drawing Sheets

U.S. PATENT DOCUMENTS

| | | | |
|---|---|---|---|
| 6,421,090 B1 * | 7/2002 | Jiang et al. | 348/452 |
| 6,618,094 B1 * | 9/2003 | De Haan et al. | 348/448 |
| 6,630,961 B1 * | 10/2003 | Shin et al. | 348/448 |
| 6,867,814 B2 * | 3/2005 | Adams et al. | 348/448 |
| 6,940,557 B2 * | 9/2005 | Handjojo et al. | 348/452 |
| 7,043,091 B2 * | 5/2006 | Michel | 382/266 |
| 7,116,372 B2 * | 10/2006 | Kondo et al. | 348/448 |
| 7,142,248 B2 * | 11/2006 | Ishii | 348/452 |
| 7,170,561 B2 * | 1/2007 | Winger et al. | 348/448 |
| 7,180,548 B2 * | 2/2007 | Mishima et al. | 348/441 |
| 7,206,027 B2 * | 4/2007 | De Haan et al. | 348/448 |
| 7,242,819 B2 * | 7/2007 | Jiang | 382/300 |
| 7,268,822 B2 * | 9/2007 | Kang et al. | 348/448 |
| 7,269,220 B2 * | 9/2007 | Alvarez | 375/240.12 |
| 7,321,396 B2 * | 1/2008 | Jung et al. | 348/452 |
| 2002/0047919 A1 * | 4/2002 | Kondo et al. | 348/441 |
| 2002/0150159 A1 * | 10/2002 | Zhong | 375/240.16 |
| 2002/0172369 A1 * | 11/2002 | Herrick | 381/3 |
| 2002/0196362 A1 * | 12/2002 | Yang et al. | 348/452 |
| 2003/0038817 A1 * | 2/2003 | Kawamura et al. | 345/606 |
| 2004/0207753 A1 * | 10/2004 | Jung | 348/452 |
| 2005/0036062 A1 * | 2/2005 | Kang et al. | 348/448 |
| 2005/0073607 A1 * | 4/2005 | Ji et al. | 348/448 |
| 2005/0122426 A1 * | 6/2005 | Winger et al. | 348/452 |

* cited by examiner

APPARATUS AND METHOD FOR CONVERTING INTERLACED IMAGE INTO PROGRESSIVE IMAGE

CROSS-REFERENCE TO RELATED APPLICATION

This application claims the priority of U.S. Provisional Patent Application No. 60/604,463, filed on Aug. 26, 2004 in the United States Patent and Trademark Office, the disclosure of which is incorporated herein by reference.

BACKGROUND OF THE INVENTION

1. Field of the Invention

The present invention relates to an apparatus and method for converting an interlaced image into a progressive image, and more particularly, to an apparatus and method for converting an interlaced image into a progressive image by interpolating the interlaced image considering characteristics of a region and the orientation of an edge to which a pixel to be interpolated belongs.

2. Description of the Related Art

There are various methods of converting an interlaced image into a progressive image. In particular, a blend method and an edge dependent interpolation method are mainly used.

In the blend method, interpolation is performed on an object pixel, using the values of pixels on preceding and following interlaced scan lines corresponding to the object pixel and the values of upper and lower pixels above and below the object pixel, and the result of interpolation is used as the value of the object pixel. The blend method is preferred since an edge of an image can be smoothly and naturally represented. However, when an interlaced image with much motion is converted into a progressive image using the blend method, a blur and an afterimage are likely to occur, and diagonal aliasing may occur at an edge of the image.

In the edge dependent interpolation method, the value of an object pixel, which is to be interpolated, is obtained using the values of pixels above and below the object pixel and the values of pixels to the left and right of the pixels above and below the object pixel.

Referring to FIG. 1, a value obtained by progressively scanning an object pixel X is computed using the value $D_{lu}$ of a pixel to the upper left of the object pixel, the value $D_{rd}$ of a pixel to the lower right of the object pixel, the value $D_{ru}$ of a pixel to the upper right of the object pixel, and the value $D_{ld}$ of a pixel to the lower left of the object pixel, and the values $V_u$ and $V_d$ of pixels above and below the object pixel.

More specifically, in the edge dependent interpolation method, the value obtained by progressively scanning an object pixel X is obtained by computing the differences between the values $V_u$ and $V_d$, between the values $D_{lu}$ and $D_{rd}$, and between the values $D_{ru}$ and $D_{ld}$, and then interpolating the object pixel X using pixels disposed in a direction having the smallest value among these differences. This method is advantageous in that slanted edges of an image can be naturally represented since image conversion is made in consideration of pixels disposed diagonally from the object pixel, thus preventing aliasing from occurring in the image.

However, the edge dependent interpolation method is disadvantageous in that the edge orientation in an image is likely to be erroneously determined and use of only one field of an interlaced image during interpolation may cause a large difference between chromaticity values of the interlaced image and a progressive image. Also, color blurring may occur during conversion of an image having an object moving rapidly into a progressive image. Accordingly, the edge dependent interpolation method requires determining whether a pixel is to be interpolated in a diagonal direction or a vertical direction.

Conventionally, the edge orientation in an image is determined by computing absolute values $|x(k)-y(-k)|$ of the differences between values of pixels along an upper scan line and pixels of a lower scan line ($k=-N, \ldots, 0, \ldots, N$), and determining that there is a diagonal line in the direction in which the smallest absolute value is obtained. Such a method is disclosed in U.S. Pat. Nos. 5,532,751 and 6,421,090. However, this method requires complex computation to obtain the absolute values of the differences between the values of possible combinations of pixels disposed diagonally from an object pixel. When computing absolute values in only several diagonal directions to reduce computational complexity, defects may occur in an image. Also, motion estimation needed for precise image conversion requires a lot of computation and large memory bandwidth, thus making it difficult to convert an interlaced image into a progressive image in real time.

SUMMARY OF THE INVENTION

According to an aspect of the present invention, there is provided an apparatus and method for converting an interlaced image into a progressive image, in which image conversion is performed considering characteristics of a region and the orientation of an edge to which a pixel to be interpolated belongs and high frequency components in a vertical direction, thereby reducing the occurrence of jaggies in a diagonal direction in the progressive image and enhancing the sharpness of high frequency region in the vertical direction.

According to one aspect of the present invention, there is provided an apparatus for converting an interlaced image into a progressive image, including: a motion detector which detects motion at an object pixel of the interlaced field image, using proceeding and following field images; an interpolation direction determination unit which determines a direction in which the object pixel is to be interpolated, using values of pixels along scan lines where the object pixel is not located when motion at the object pixel is detected; a first interpolator which spatially interpolates the object pixel according to the determined direction; and a second interpolator which resets a value of the object pixel using corresponding values of pixels of the preceding and following field images and a value obtained by spatially interpolating the object pixel when the object pixel contains high-frequency components in the vertical direction.

According to another aspect of the present invention, the motion detector detects the motion at the object pixel using the difference between values of pixels of the preceding and following field images adjacent to the object pixel.

According to another aspect of the present invention, the motion detector detects the motion of the object pixel using the difference between values of first pixels in the preceding and following field images corresponding to the object pixel, the differences between values of second pixels in the preceding and following field images corresponding to pixels adjacent to the object pixel, the difference between values of third pixels adjacent to the object pixel above and below the object pixel, and pixels of the preceding field image corresponding to the third pixels, and the difference between values of the third pixels and corresponding pixels of the following field image.

According to another aspect of the present invention, the image conversion apparatus further includes a third interpolator interpolating the object pixel by setting a value of the object pixel to a value of the pixel of the preceding field image that corresponds to the object pixel when there is no motion at the object pixel.

According to another aspect of the present invention, the interpolation direction determination unit determines a direction in which the object pixel is to be interpolated as a vertical direction when the difference between values of pixels along scan lines above and below the object pixel, which correspond to the object pixel, is less than a predetermined threshold value.

According to another aspect of the present invention, the interpolation direction determination unit determines a direction in which the object pixel is to be interpolated as a diagonal direction when the difference between values of pixels along scan lines above and below the object pixel which are adjacent to the object pixel, is equal to or greater than a predetermined threshold value.

According to another aspect of the present invention, the interpolation direction determination unit includes: a first differential value calculator calculating a first differential value between pixels of the input interlaced field image along scan lines above and below the object pixel in a first diagonal direction; a second differential value calculator calculating a second differential value between pixels of the input interlaced field image along scan lines above and below the object pixel in a second diagonal direction; and a direction determination unit calculating a third differential value between the first and second differential values, and determining a direction in which the object pixel is to be interpolated using the smaller of the first and second differential values when the third differential value is larger than a predetermined threshold value.

According to another aspect of the present invention, the second interpolator resets the value of the object pixel by multiplying the value obtained by spatially interpolating the object pixel by a first weight, multiplying values of the corresponding pixels of the preceding and following field images by a second weight, combining the results of multiplication, dividing the result of combining by a predetermined constant, and resetting the value of the object pixel to the result of division.

According to another aspect of the present invention, there is provided a method of converting an interlaced image into a progressive image, including: detecting motion at an object pixel of the interlaced field image, using preceding and following field images; determining a direction in which the object pixel is to be interpolated when motion at the object pixel is detected using values of pixels along scan lines where the object pixel is not located; spatially interpolating the object pixel according to the determined direction; and resetting a value of the object pixel using corresponding pixels of the preceding and following field images and a value obtained by spatially interpolating the object pixel when the object pixel contains high-frequency components in the vertical direction.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
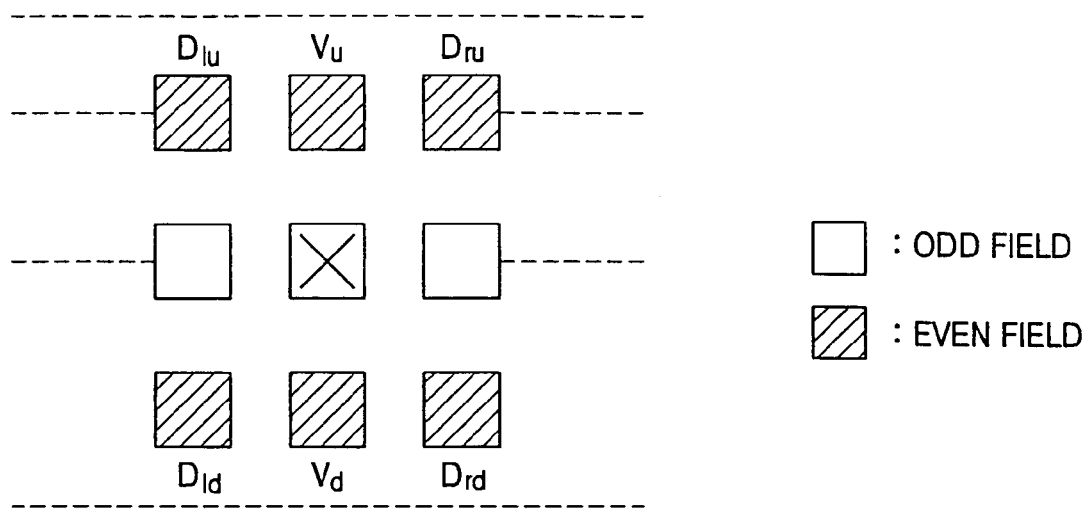
FIG. 1 illustrates an arrangement of pixels illustrating a conventional edge dependent interpolation method.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
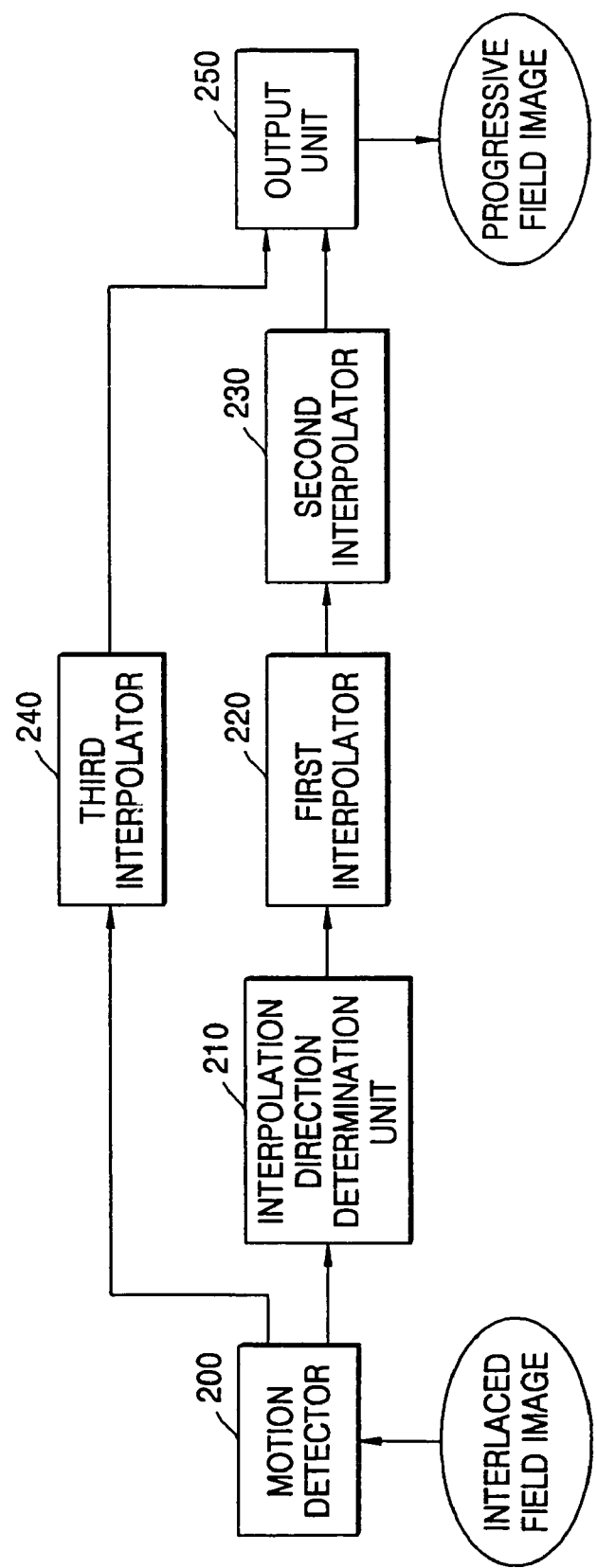
FIG. 2 is a block diagram of an image conversion apparatus according to an embodiment of the present invention.

FIG. 2 is a block diagram of an apparatus for converting an interlaced image into a progressive image according to an embodiment of the present invention. The apparatus includes motion detector 200, an interpolation direction determination unit 210, a first interpolator 220, a second interpolator 230, a third interpolator 240, and an output unit 250.

Figure 3:
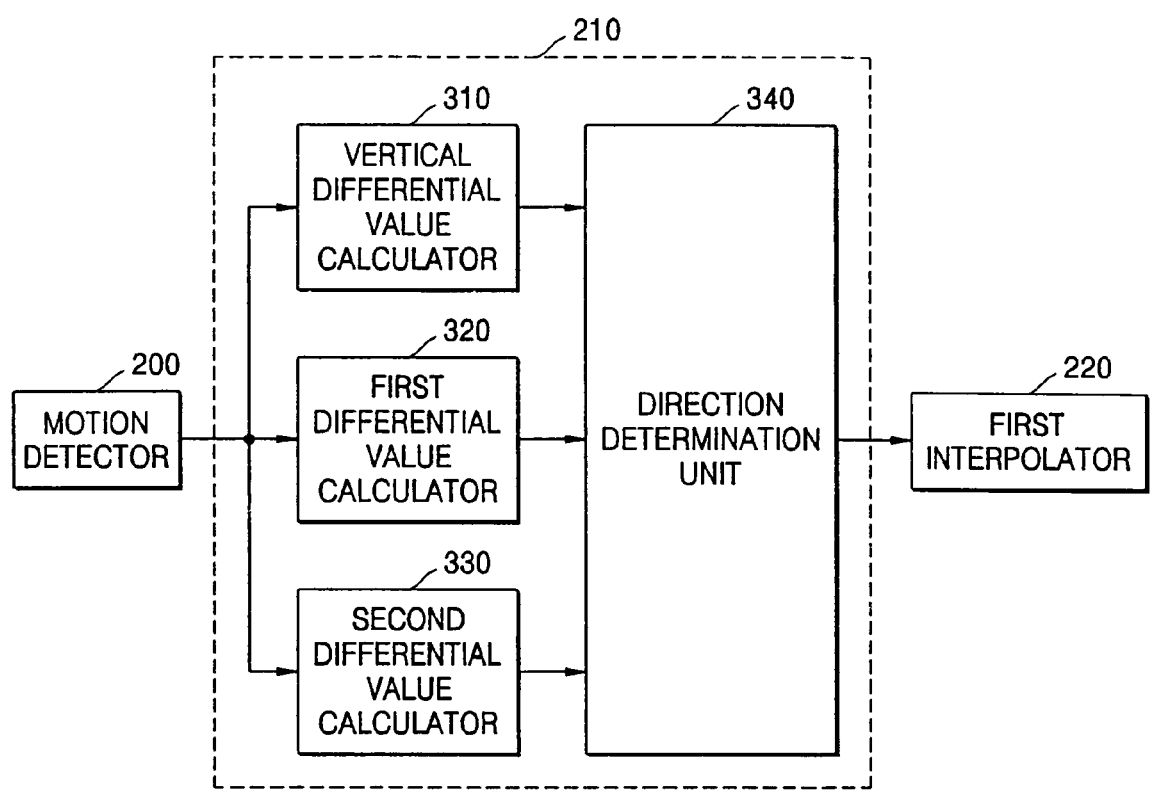
FIG. 3 is a detailed block diagram of an interpolation direction determination unit of FIG. 2.

FIG. 3 is a detailed block diagram of the interpolation direction determination unit 210 of FIG. 2. Referring to FIG. 3, the interpolation direction determination unit 210 includes a vertical differential value calculator 310, a first differential value calculator 320, a second differential value calculator 330, and a direction determination unit 340.

Figure 4:
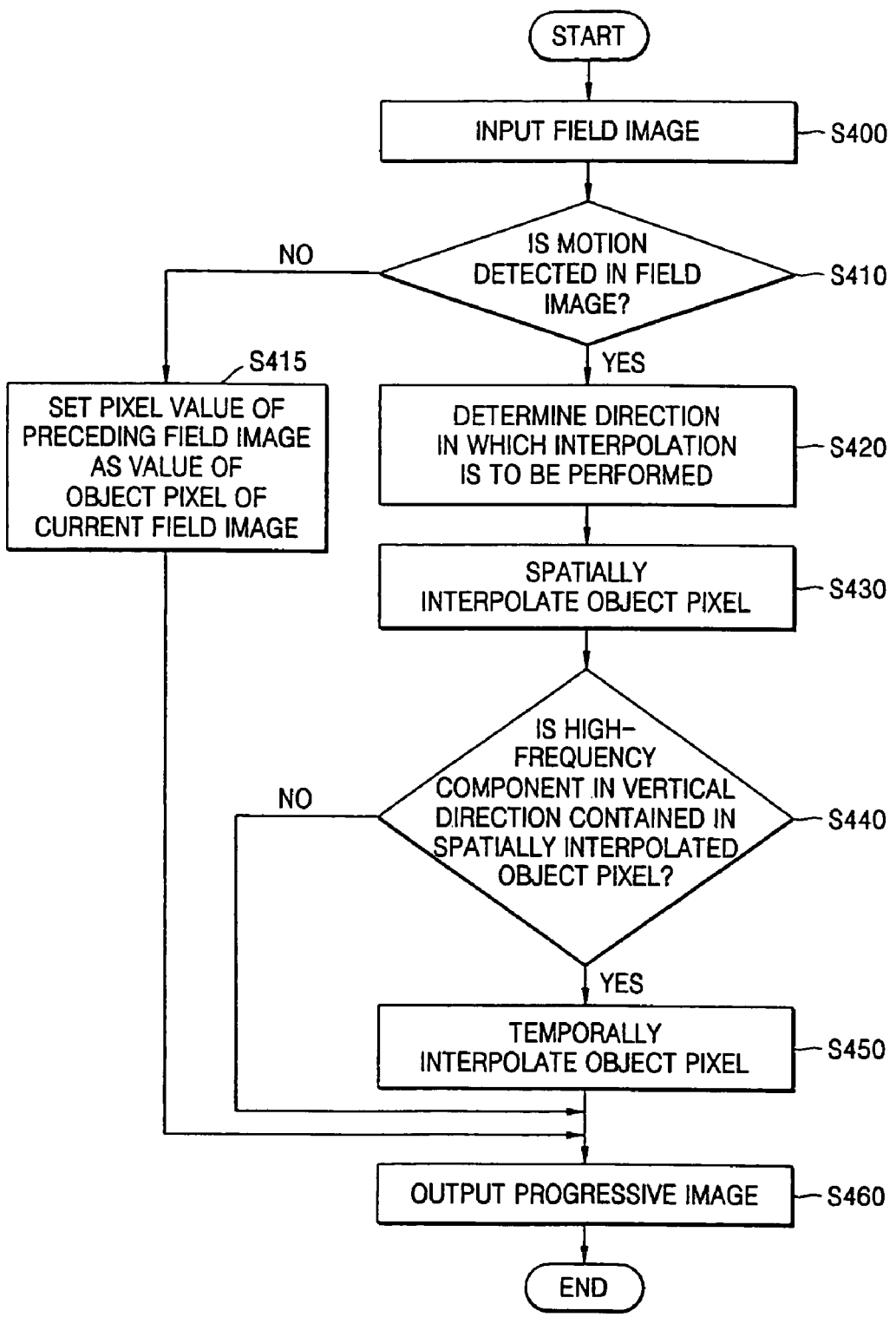
FIG. 4 is a flowchart illustrating an image conversion method according to an embodiment of the present invention.

FIG. 4 is a flowchart illustrating a method of converting an interlaced image into a progressive image according to an embodiment of the present invention.

Referring to FIGS. 2 through 4, when the interlaced image is input as a field image to the motion detector 200 of FIG. 2 (S400), the motion detector 200 determines whether motion is detected in each pixel to be interpolated in the current field image (S410).

Figure 6:
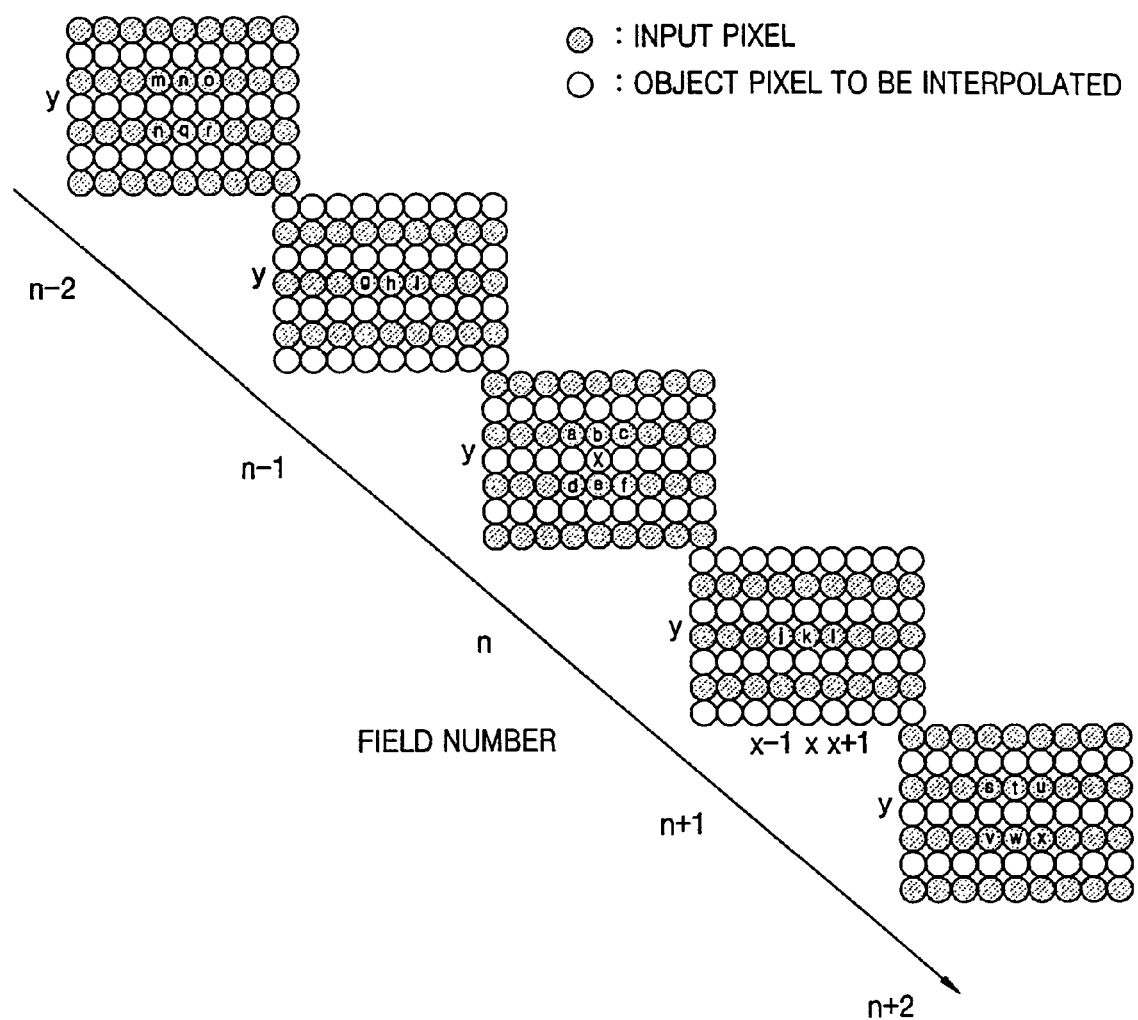
FIG. 6 illustrates an arrangement of pixels illustrating motion detection according to an embodiment of the present invention.

The operation of the motion detector 200 will now be described in detail with reference to FIG. 6 which illustrates an arrangement of pixels explaining motion detection according to an embodiment of the present invention. FIG. 6 reveals that the difference between pixel values of preceding and following field images of the current field image are very small or zero. Thus, whether there is motion in the current field image can be determined using the pixel values of the preceding and following field images. The motion detector 200 computes a value M representing a change at an object pixel value using two preceding field images and two following field images, based on the following Equation (1). If the value M is less than a first threshold value T1, the motion detector 200 determines that there is no motion at object pixel of the current field image. If the value M is equal to or greater than the first threshold value T1, the motion detector 200 determines that there is motion at an object pixel of the current field image.

$$M=|g-j|+|h-k|+|i-l|+|a-m|+|b-n|+|c-o|+|d-p|+|e-q|+|f-r|+|a-s|+|b-t|+|c-u|+|d-v|+|e-w|+|f-x| \quad (1)$$

In Equation (1) and FIG. 6, X denotes an object pixel of the current field image (n-th) that is to be interpolated, and a through x denote pixel values of the field images ((n−2)-th through (n+2)-th) as shown in FIG. 6.

When the motion detector 200 determines that there is no motion at an object pixel of the current field image, the third interpolator 240 interpolates the object pixel using a corresponding pixel of the preceding field image. That is, the third interpolator 240 sets the pixel value of the preceding field image as the value of the object pixel of the current field image (S415).

When the motion detector 200 determines that there is motion at the object pixel of the current field image, the interpolation direction determination unit 210 determines a direction in which interpolation is to be performed (S420).

Figure 5:
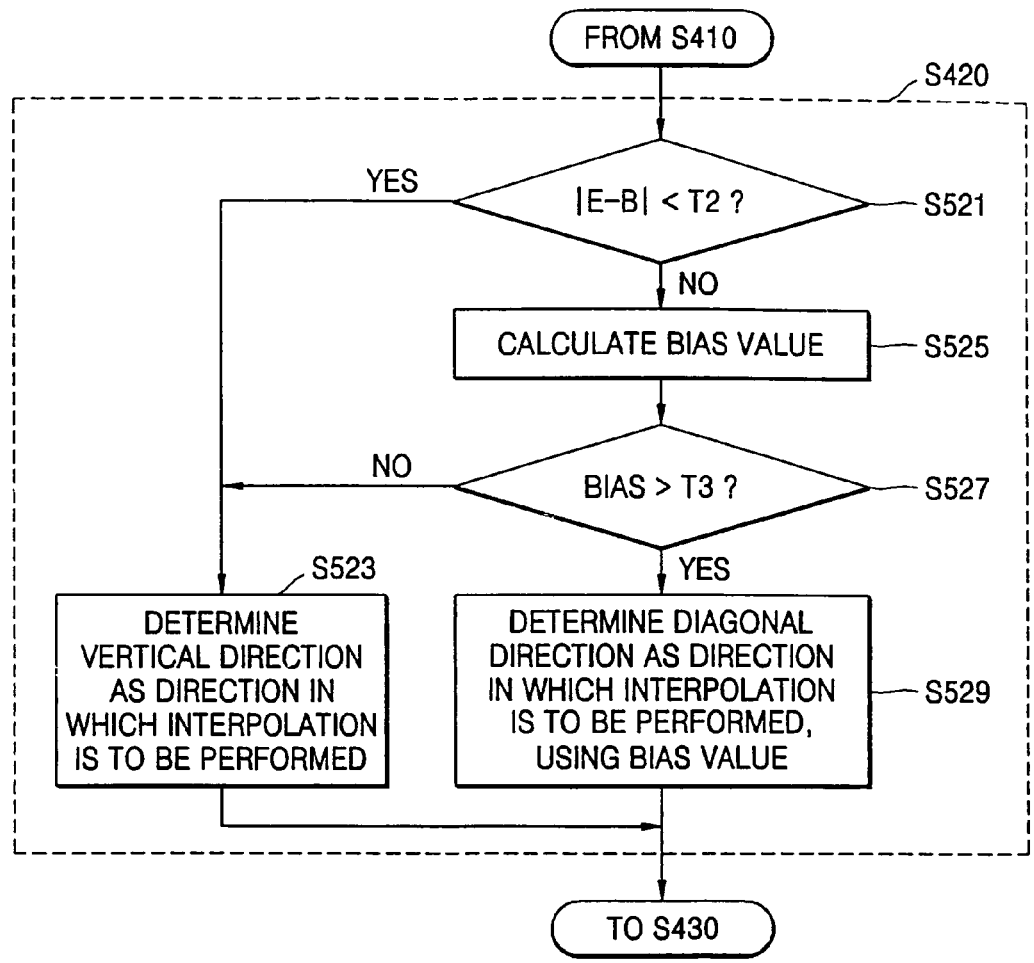
FIG. 5 is a detailed flowchart illustrating operation S420 of FIG. 4.

A method of determining a direction in which interpolation is to be performed according to an embodiment of the present invention will now be described with reference to operation S420 illustrated in FIGS. 5 and 7.

Figure 7:
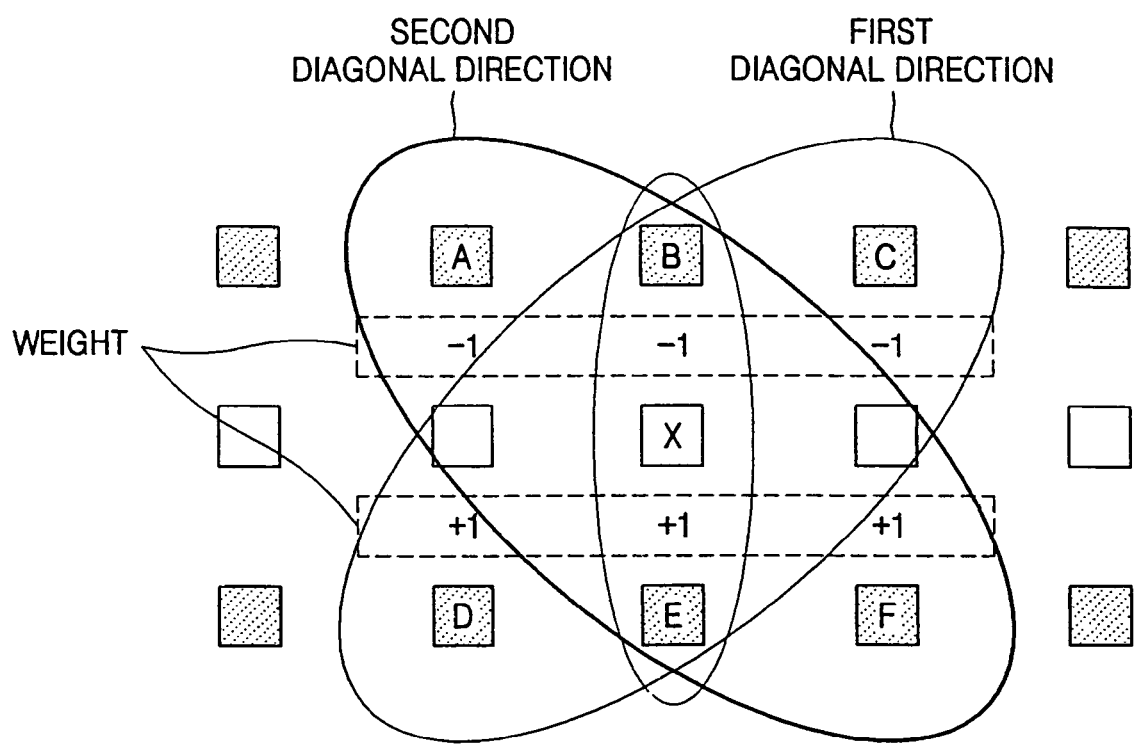
FIG. 7 illustrates an arrangement of pixels illustrating a method of determining a direction in which interpolation is to be performed according to an embodiment of the present invention.

FIG. 7 illustrates an arrangement of pixels explaining this method according to an embodiment of the present invention. First, when the motion detector 200 determines that there is motion at the object pixel of the current field image, the vertical differential value calculator 310 computes a vertical differential value vert using the following Equation (2) and outputs the vertical differential value vert to the direction determination unit 340, and the direction determination unit 340 compares the vertical differential value vert with a second threshold value T2 to determine whether interpolation is to be performed in a vertical direction (S521).

$$\text{vert}=|E-B| \quad (2),$$

wherein B and E denote the values of pixels above and below the object pixel as shown in FIG. 7.

When the vertical differential value vert is less than the second threshold value T2, the direction determination unit 340 determines as the vertical direction the direction in which interpolation is to be performed and outputs the result of determination to the first interpolator 220 (S523).

If the vertical differential value vert is equal to or greater than the second threshold value T2, the direction determination unit 340 receives a differential value in a first diagonal direction from the first differential value calculator 320, receives a differential value in a second diagonal direction from the second differential value calculator 330, and computes a bias value using the differential values and the following Equation (3) (S525).

$$\text{Bias}=||-B-C+D+E|-|-A-B+E+F|| \quad (3),$$

wherein |−B−C+D+E| denotes the differential value in the first diagonal direction, received from the first differential value calculator 320; and |−A−B+E+F| denotes the differential value in the second diagonal direction, received from the second differential calculator 330.

Next, the direction determination unit 340 determines whether the bias value is larger than a third threshold value T3 (S527). When the bias value is less than or equal to the third threshold value T3, the direction determination unit 340 determines that interpolation is to be performed in the vertical direction (S523). When the bias value is greater than the third threshold value T3, the direction determination unit 340 determines that interpolation is to be performed in a diagonal direction (S529).

Operations S527 and S529 will now be described in greater detail. When it is determined that a high-frequency component is present at the object pixel in a vertical direction, that is, when the difference of values between the pixels above and below the object pixel is large, which means the object pixel belongs to an edge, then it is determined whether the object pixel is located in a diagonal region.

Referring to FIG. 7, the diagonal direction of an object pixel X is determined using three pixel values A, B, and C in a scan line above the object pixel X and three pixels D, E, and F in a scan line below the object pixel X. Here, the signs of weights given to the pixel values A, B, and C are opposite to those of weights given to the pixel values D, E, and F. In detail, the diagonal direction of the object pixel X is determined by multiplying these pixel values A, B, C, D, E, and F by given corresponding weights, respectively, summing the results of multiplication to generate a weighted sum, and determining the diagonal direction of the object pixel value X according to the weighted sum. The signs of the weights given to the values of the pixels along the scan line above the object pixel are opposite to the signs of the weights given to the values of the pixels along the scan line below the object pixel in order to minimize the weighted sum obtained when the value of a pixel in the scan line above the object pixel is similar to the value of a pixel in the scan line below the object pixel. If the values of pixels in the scan line above the object pixel are multiplied by weights with opposite signs to the weights by which the values of pixels in the scan line below the object pixel are multiplied, and the values of pixels in the scan lines above and below the object pixel are similar, the weighted sum is near to 0, and is surely smaller than the weighted sum obtained when there are no similar pixel values in the scan lines above and below the object pixel. That is, the above method computes the differences between the pixel values.

According to an aspect of this method, although all possible cases where diagonal lines can appear in pixel groups are not considered, it is possible to precisely detect a diagonal line to which the object pixel belongs.

The direction determination unit 340 uses the bias value computed using Equation (3) when determining a direction of a diagonal line to which the object pixel belongs, and determines a direction in which a differential value with a smallest absolute value is obtained as a diagonal direction when the bias value is larger than the third threshold value T3. That is, when Bias>T3 and |−B−C+D+E|<|−A−B+E+F|, the direction determination unit 340 determines that a diagonal line is present in a first diagonal direction of FIG. 7. When Bias>T3 and |−B−C+D+E|>|−A−B+E+F|, the direction determination unit 340 determines that a diagonal line is present in a second diagonal direction of FIG. 7.

Conventionally, whether an object pixel is located in a vertical direction or a diagonal direction is determined using an absolute value of the differences between values of pixels above and below the object pixel and determining whether there is an edge of an image in the direction in which the minimum absolute value is obtained. According to an aspect of the present invention, the diagonal direction of an object pixel is determined while detecting edges of the image from various directions using a plurality of pixel values. FIG. 7 is a diagram illustrating detecting of edges covering the values with the values A, B, E, and F in several directions at once. Therefore, according to an aspect of the present invention, it is possible to detect diagonal lines with less computational complexity while reducing artifacts caused by errors in the detection of diagonal lines, as compared to a conventional method.

After operation S420, the first interpolator 220 receives from the interpolation direction determination unit 210 the result of determination regarding the direction in which interpolation is to be performed, and interpolates the value of the object pixel spatially in the determined direction using a predetermined spatial filter (S430).

Figure 8:
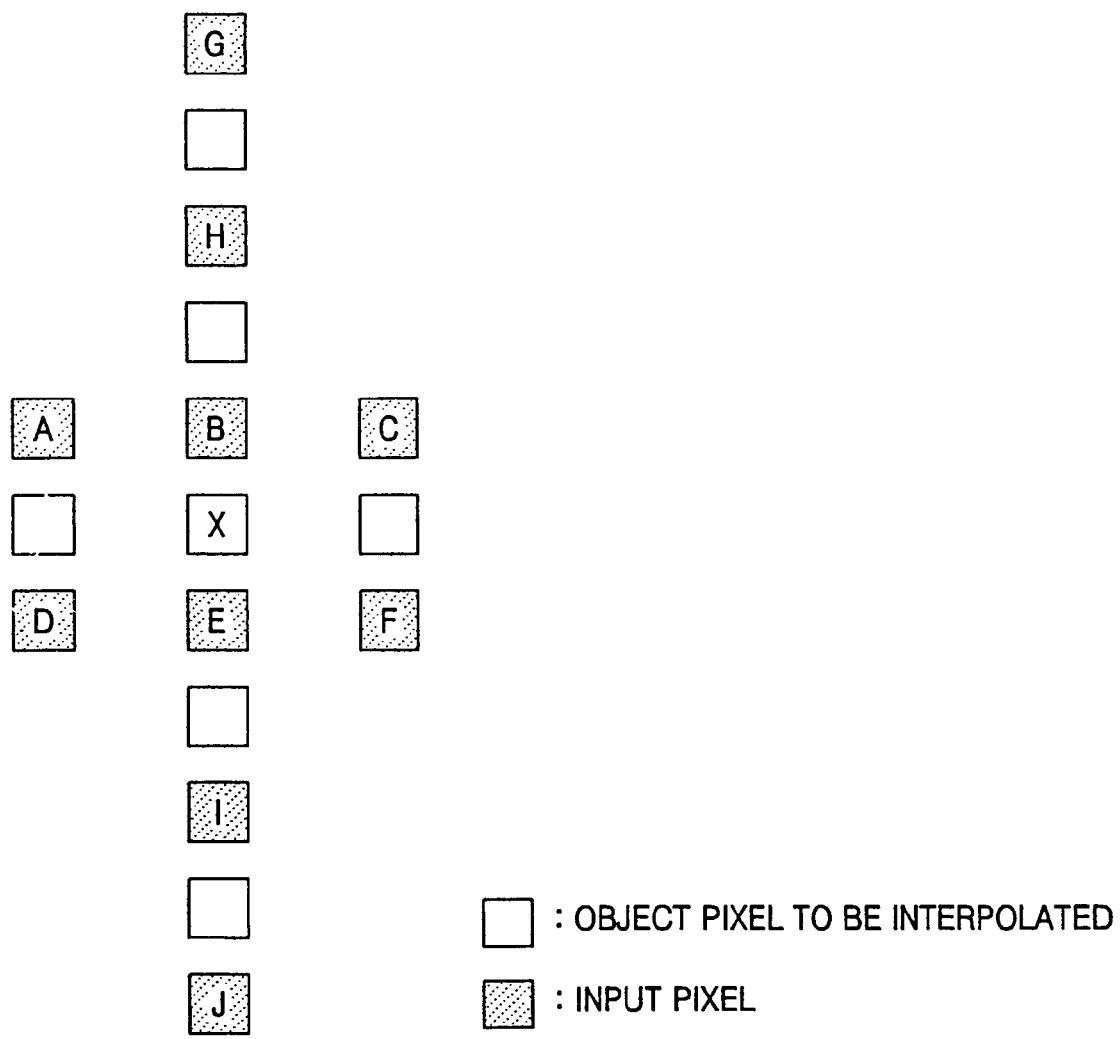
FIG. 8 illustrates an arrangement of pixels illustrating spatial filtering performed in a determined direction in which interpolation is to be performed, using only information regarding a current field image according to an embodiment of the present invention.

FIG. 8 illustrates an arrangement of pixels explaining spatial filtering performed in a determined direction in which interpolation is to be performed, using only information regarding a current field image, according to an embodiment of the present invention. The first interpolator 220 uses a 2-tap filter, which is a low-pass filter, when computing an interpolated value X' of an object pixel X, which is to be interpolated, in a diagonal direction, and a 6-tap filter, which is a high-pass filter, when computing an interpolated value X' of the object pixel X in a vertical direction. Interpolation of the object pixel X using spatial filtering is performed using the following Equations (4) through (6):

$$X'=(C+D)>>1 \quad (4)$$

$$X'=(A+F)>>1 \quad (5)$$

$$X'=(20*(B+E)-5*(H+I)+G+J)>>5 \quad (6)$$

wherein A through J denote values of pixels shown in FIG. 8, and ">>" denotes a shift operator. For example, "x>>y" is understood to be a function that divides a value x by a value $2^y$.

The first interpolator 220 computes the interpolated value X' using Equation (4) with the 2-tap filter when the direction determined by the interpolation direction determination unit 210 is the first diagonal direction shown in FIG. 7, and computes the interpolated value X' using Equation (5) with the 2-tap filter when the determined direction is the second diagonal direction shown in FIG. 7. If the determined direction is the vertical direction, the first interpolator 220 computes the interpolated value X' using Equation (6) with the 6-tap filter.

Conventionally, a high-pass filter is used to compute an interpolated value of an object pixel that is to be interpolated so as to preserve an edge of an image along a diagonal direction. According to an aspect of the present invention, the edge of an image in a diagonal direction is smoothed by canceling jaggies using the 2-tap filter which is a low-pass filter, and high-frequency components are preserved in the remaining portions of the image using the 6-tap filter which is a high-pass filter.

After operation S430, the second interpolator 230 receives a value obtained by spatially interpolating the object pixel from the first interpolator 220, and compares the vertical differential value vert computed using Equation (2) with a fourth threshold value T4 so as to determine whether a high-frequency component in a vertical direction is present in the spatially interpolated object pixel (S440). The second interpolator 230 determines that the high-frequency component is present when the vertical differential value vert is equal to or greater than the fourth threshold value T4, and determines the high-frequency component is not present otherwise.

The high-frequency component in the vertical direction indicates that an edge of the image exists in a horizontal direction, and the difference of values of the corresponding pixels between the preceding field image and the current field image are very large, thus causing flickering. To solve this problem, the value X' of the spatially interpolated object pixel must be reset using time information. To reset the value X', the second interpolator 230 resets the value X' of the object pixel to a new value X" using the following Equation (7) (S450).

$$X''=(10*X'+3*h+3*k)>>4 \quad (7)$$

wherein h and k denote pixel values of field images as shown in FIG. 6.

Operations S410 through S450 are performed on all pixels of the current field image that must be interpolated so as to convert the current field image into a progressive image, and the output unit 250 outputs the progressive image (S460).

Examples of a 720×240 interlaced image and a progressive image converted from the interlaced image are shown in FIGS. 9A through 9C, and FIGS. 10A through 10C.

Figure 9A:
FIG. 9A illustrates an input interlaced image.
Figure 9B:
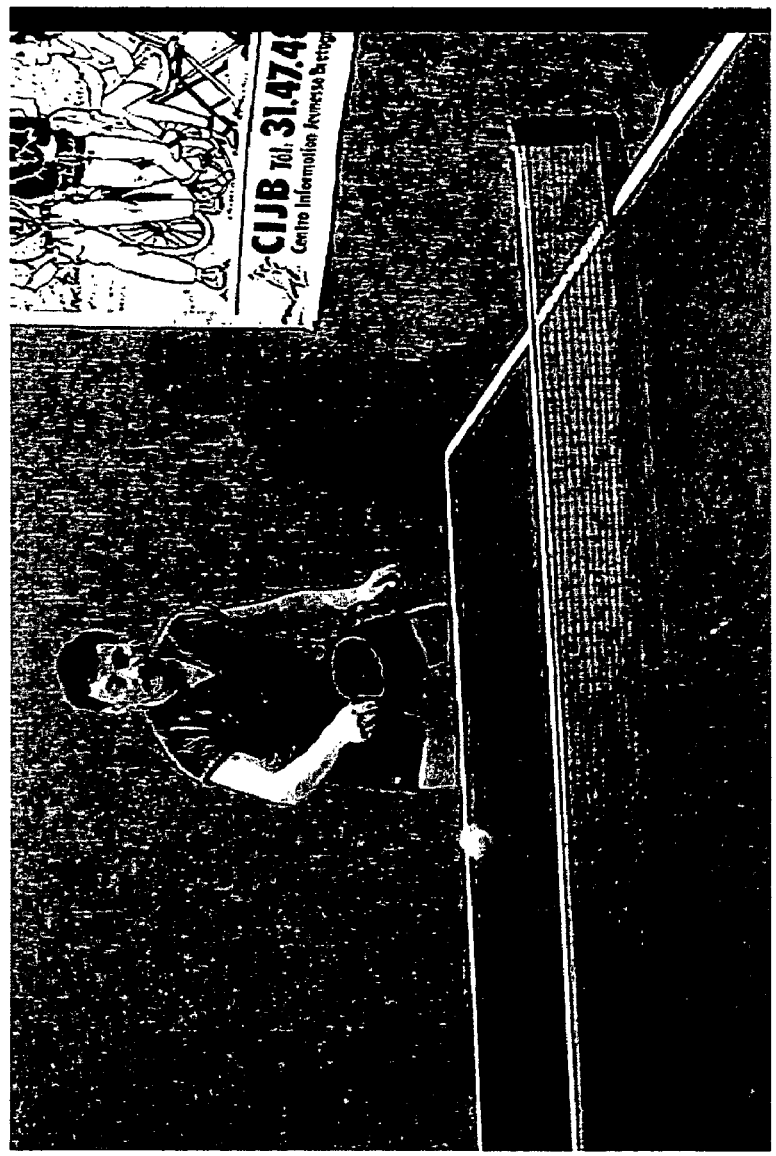
FIG. 9B illustrates a progressive image converted from the input interlaced image of FIG. 9A using an image conversion method according to an embodiment of the present invention.
Figure 9C:
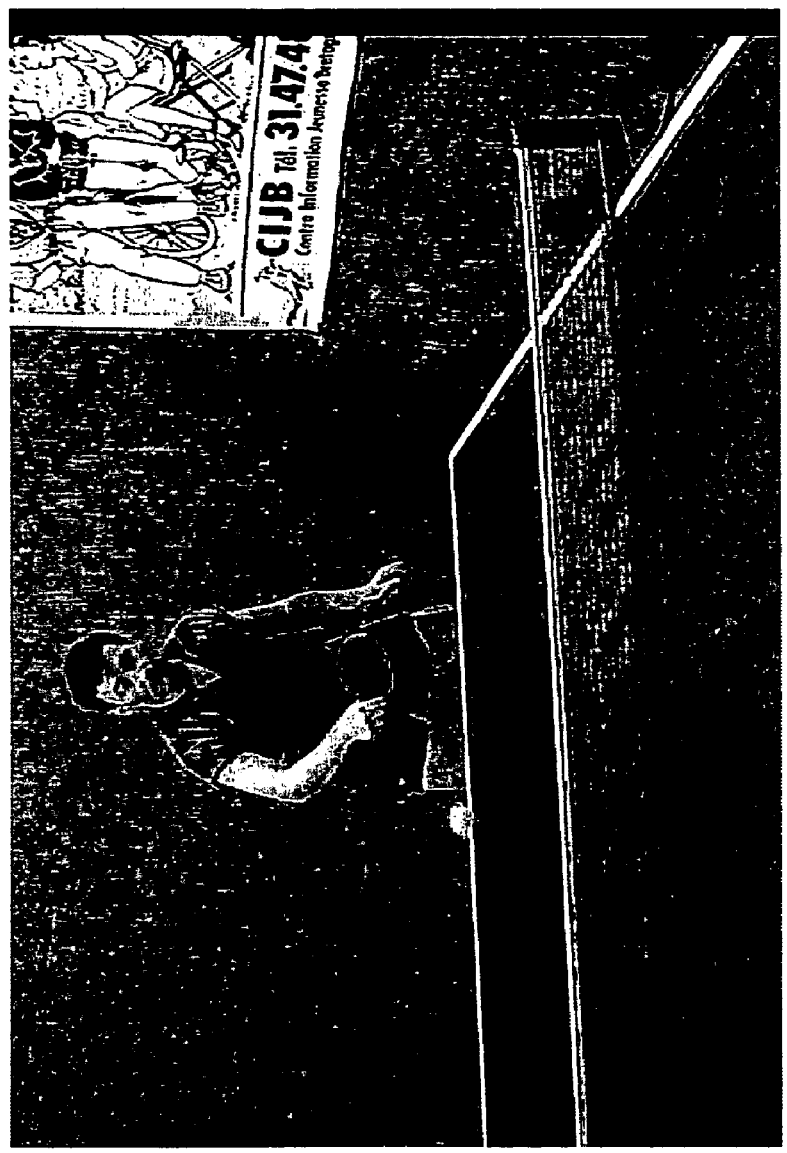
FIG. 9C illustrates a progressive image converted from the input interlaced image of FIG. 9A using a conventional image conversion method.

In detail, FIG. 9A illustrates an input interlaced image. FIG. 9B illustrates a progressive image converted from the interlaced image of FIG. 9A using an image conversion method according to an embodiment of the present invention. FIG. 9C illustrates a progressive image converted from the interlaced image using a conventional image conversion method. Referring to FIG. 9C, jaggies occur in the right arm and left shoulder of a person who is playing table tennis, but referring to FIG. 9B, the jaggies are lessened. Also, a line of the edges of a ping-pong table looks unclear in FIG. 9C, but the line looks clearer in FIG. 9B.

Figure 10A:
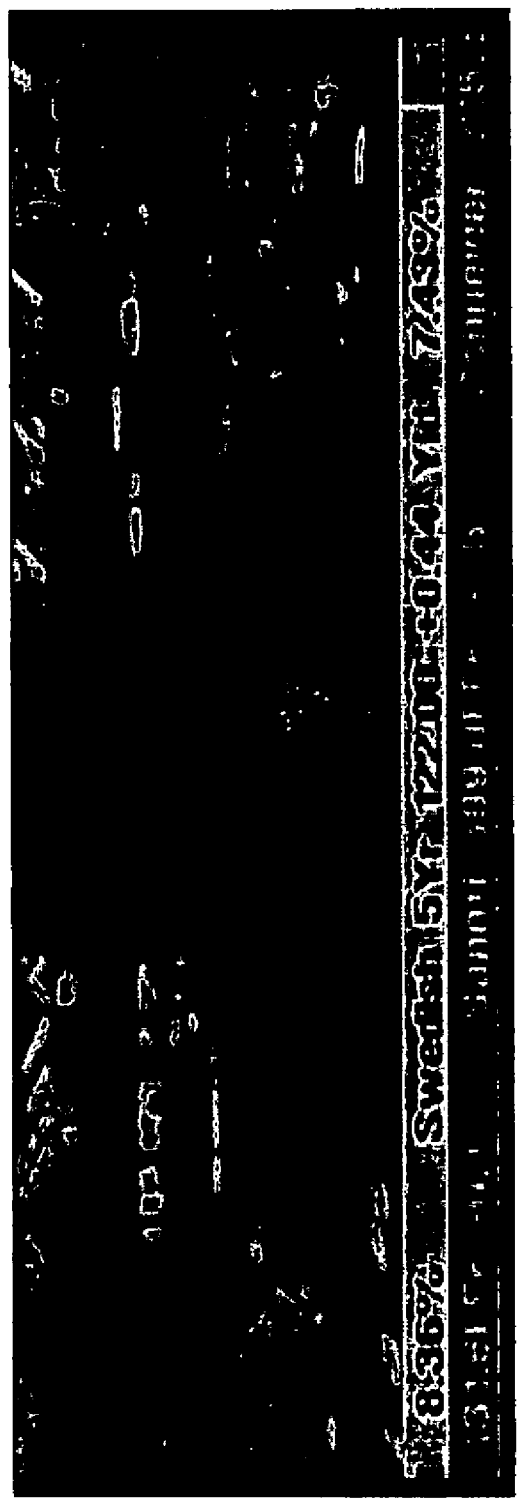
FIG. 10A illustrates another input interlaced image.
Figure 10B:
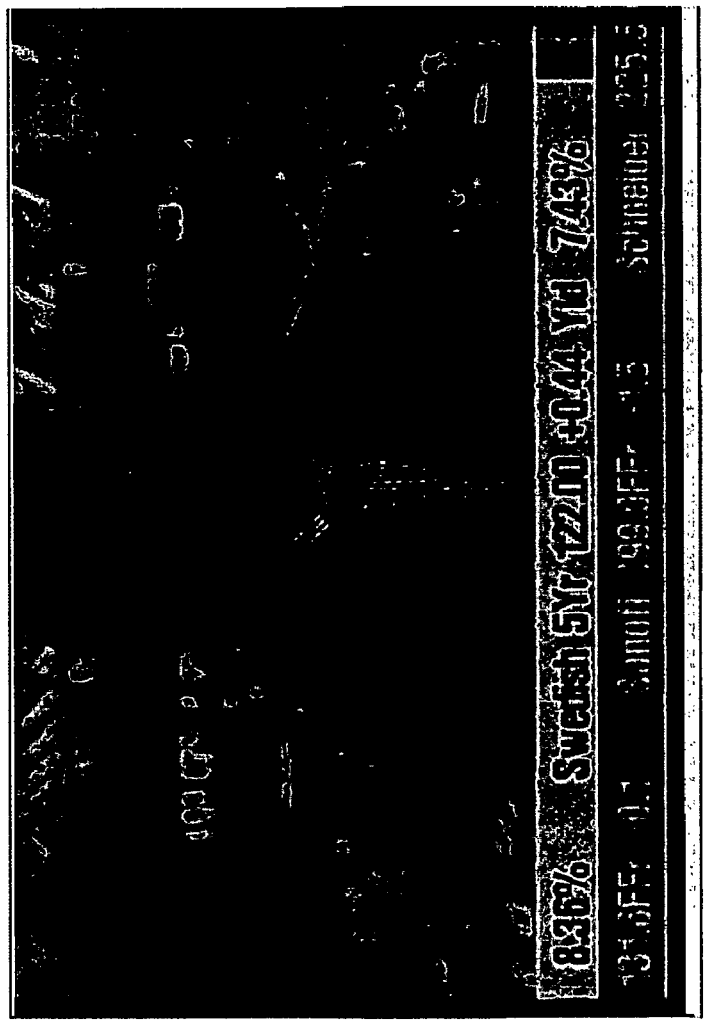
FIG. 10B illustrates a progressive image converted from the input interlaced image of FIG. 10A using an image conversion method according to an embodiment of the present invention.
Figure 10C:
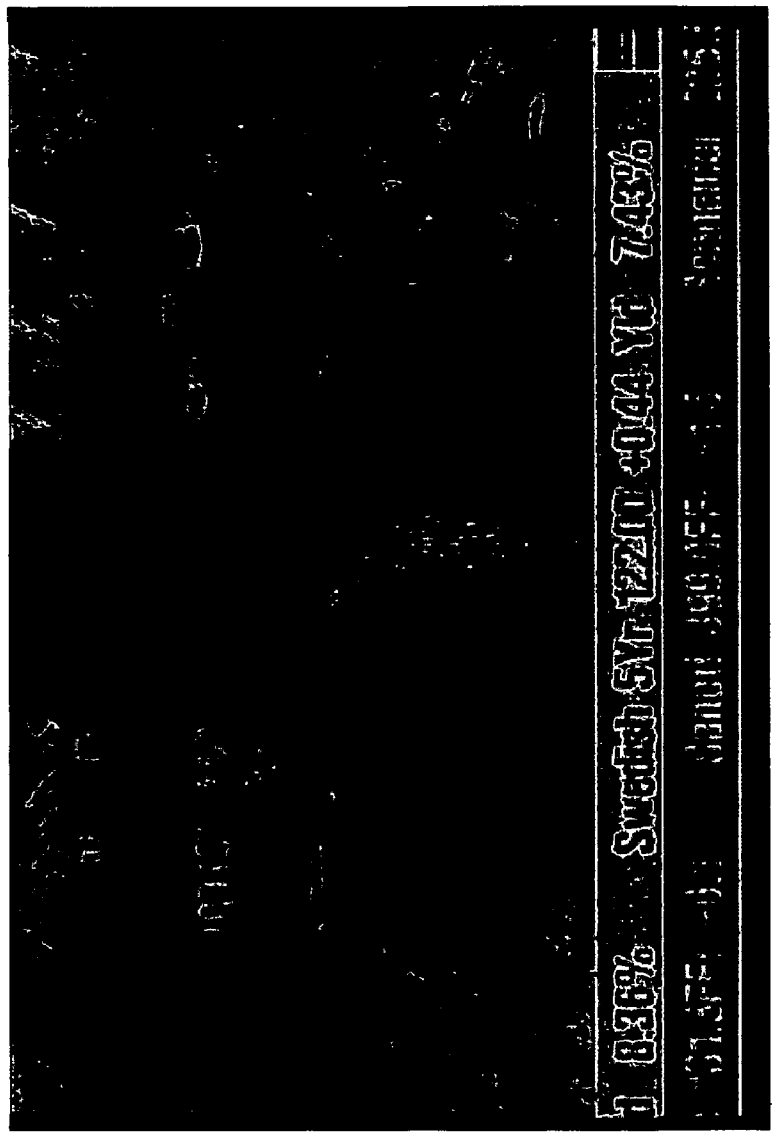
FIG. 10C illustrates a progressive image converted from the input interlaced image of FIG. 10A using a conventional image conversion method.

Similarly, FIG. 10A illustrates another interlaced image. FIG. 10B illustrates a progressive image converted from the interlaced image of FIG. 10A using an image conversion method according to an embodiment of the present invention. FIG. 10C illustrates a progressive image converted from the interlaced image using a conventional image method. Referring to FIG. 10C, jaggies occur in characters included in the progressive image in a diagonal direction, but referring to FIG. 10B, the occurrence of the jaggies is lessened.

The present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable recording medium can be distributed among computer systems that are interconnected through a network, and the present invention may be stored and implemented as a computer readable code in the distributed system.

As described above, according to an aspect of the present invention, an interlaced image is converted into a progressive image by interpolating pixels of the interlaced image with motion either in a vertical direction or in a diagonal direction and setting the values of the other pixels with no motion to the values of corresponding pixels of a previous field image. Accordingly, it is possible to convert an interlaced image into a progressive image adaptively to image motion while reducing damage to the original image.

In particular, it is possible to minimize an error in determining the interpolation direction of an object pixel, thus reducing noise in an image. Further, it is possible to detect a diagonal edge to which an object pixel belongs to in an image with a simple algorithm.

An image conversion apparatus and method according to an aspect of the present invention are applicable to an image processing apparatus such as a digital television or a DVD player. If used in such an image processing apparatus, the occurrence of jaggies in a progressive image can be reduced and the definition of an image at a high frequency can be increased, thereby improving the quality of the image.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus converting an input interlaced field image into a progressive image by interpolating the interlaced field image, comprising:
   a motion detector which detects motion at an object pixel of the interlaced field image, using proceeding and following field images;
   an interpolation direction determination unit which determines a direction in which the object pixel is to be interpolated, using values of pixels along scan lines where the object pixel is not located when motion at the object pixel is detected;
   a first interpolator which spatially interpolates the object pixel in the determined direction; and
   a second interpolator which selectively resets a value of the spatially interpolated object pixel using corresponding values of pixels of the preceding and following field images and another value obtained by the spatially interpolating of the object pixel, based on a determination that the spatially interpolated object pixel contains a vertical high-frequency component.

2. The apparatus of claim 1, wherein the motion detector detects the motion at the object pixel using a difference between the values of the pixels of the preceding and following field images adjacent to the object pixel.

3. The apparatus of claim 1, wherein the motion detector detects the motion of the object pixel using a difference between values of first pixels in the preceding and following field images corresponding to the object pixel, a difference between values of second pixels in the preceding and following field images corresponding to pixels adjacent to the object pixel, a difference between values of third pixels adjacent to the object pixel above and below the object pixel, and pixels of the preceding field image corresponding to the third pixels, and a difference between values of the third pixels and corresponding pixels of the following field image.

4. The apparatus of claim 3, wherein the differences between the values of the pixels are absolute values, and
   when a sum of the absolute values is equal to or greater than a first threshold value, determining that there is motion at the object pixel.

5. The apparatus of claim 1, further comprising a third interpolator interpolating the object pixel by setting the value of the object pixel to another value of the pixel of the preceding field image that corresponds to the object pixel when there is no motion at the object pixel.

6. The apparatus of claim 1, wherein the interpolation direction determination unit determines the direction in which the object pixel is to be interpolated as a vertical direction when a difference between the values of the pixels along scan lines above and below the object pixel, which correspond to the object pixel, are less than a predetermined threshold value.

7. The apparatus of claim 1, wherein the interpolation direction determination unit determines the direction in which the object pixel is to be interpolated as a diagonal direction when a difference between the values of the pixels along scan lines above and below the object pixel which are adjacent to the object pixel, are equal to or greater than a predetermined threshold value.

8. The apparatus of claim 7, wherein the interpolation direction determination unit determines the direction in which the object pixel is to be interpolated so that the difference between values of a predetermined number of pixels along the scan lines above the object pixel and a predetermined number of pixels along the scan lines below the object pixel are minimized.

9. The apparatus of claim 1, wherein the interpolation direction determination unit comprises:
   a first differential value calculator calculating a first differential value between pixels of the input interlaced field image along scan lines above and below the object pixel in a first diagonal direction;
   a second differential value calculator calculating a second differential value between the pixels of the input interlaced field image along scan lines above and below the object pixel in a second diagonal direction; and
   a direction determination unit calculating a third differential value between the first and second differential values, and determining the direction in which the object pixel is to be interpolated using a smaller of the first and second differential values when the third differential value is determined to meet a predetermined threshold value.

10. The apparatus of claim 9, wherein the direction determination unit determines the direction in which the object pixel is to be interpolated is a diagonal direction according to the smaller of the first and second differential values when the third differential value meets a predetermined threshold value and determines the direction in which the object pixel is to be interpolated is a non-diagonal direction when the third differential value does not meet the predetermined threshold value.

11. The apparatus of claim 1, wherein the first interpolator interpolates the object pixel using a 6-tap filter when the determined direction is a vertical direction.

12. The apparatus of claim 1, wherein the first interpolator interpolates the object pixel using a 2-tap filter when the determined direction is a diagonal direction.

13. The apparatus of claim 1, wherein the spatial interpolation is performed based only on information regarding the interlaced field image.

14. An apparatus converting an input interlaced field image into a progressive image by interpolating the interlaced field image, comprising:
   a motion detector which detects motion at an object pixel of the interlaced field image, using proceeding and following field images;
   an interpolation direction determination unit which determines a direction in which the object pixel is to be interpolated, using values of pixels along scan lines where the object pixel is not located when motion at the object pixel is detected;

a first interpolator which spatially interpolates the object pixel in the determined direction; and a second interpolator which selectively resets a value of the object pixel using corresponding values of pixels of the preceding and following field images and another value obtained by the spatially interpolating of the object pixel based on the object pixel being determined to contain a vertical high-frequency component, wherein the second interpolator resets the value of the object pixel by multiplying the other value obtained by spatially interpolating the object pixel by a first weight, multiplying the values of the corresponding pixels of the preceding and following field images by a second weight, combining results of the multiplication, dividing a result of the combination by a predetermined constant, and resetting the value of the object pixel to the result of the division.

15. An apparatus converting an input interlaced field image into a progressive image by interpolating the interlaced field image, comprising:

a motion detector which detects motion at an object pixel of the interlaced field image, using proceeding and following field images;

an interpolation direction determination unit which determines a direction in which the object pixel is to be interpolated, using values of pixels along scan lines where the object pixel is not located when motion at the object pixel is detected;

a first interpolator which spatially interpolates the object pixel in the determined direction; and a second interpolator which selectively resets a value of the spatially interpolated object pixel using corresponding values of pixels of the preceding and following field images and another value obtained by the spatially interpolating of the object pixel, based on a determination that the spatially interpolated object pixel contains a vertical high-frequency component, wherein the preceding field images are two field images temporally preceding the input interlaced field image, and the following field images are two field images temporally following the input interlaced field image.

16. A method of converting an interlaced field image into a progressive frame image by interpolating the interlaced field image, comprising:

detecting, using at least one processing device, motion at an object pixel of the interlaced field image, using preceding and following field images;

determining a direction in which the object pixel is to be interpolated when motion at the object pixel is detected using values of pixels along scan lines where the object pixel is not located;

spatially interpolating the object pixel according to the determined direction; and selectively resetting a value of the spatially interpolated object pixel using corresponding pixels of the preceding and following field images and another value obtained by the spatially interpolating of the object pixel, based on a determination that the spatially interpolated object pixel contains high-frequency components in a vertical direction.

17. The method of claim 16 wherein during the motion detection, motion at the object pixel is detected using differences between values of pixels of the preceding and following field images adjacent to the object pixel.

18. The method of claim 16, wherein during the motion detection, the motion of the object pixel is detected using a difference between values of first pixels in the preceding and following field images corresponding to the object pixel, a difference between values of second pixels in the preceding and following field images corresponding to pixels adjacent to the object pixel, a difference between values of third pixels adjacent to the object pixel above and below the object pixel, and pixels of the preceding field image corresponding to the third pixels, and a difference between values of the third pixels and corresponding pixels of the following field image.

19. The method of claim 18, wherein the differences between the values of the pixels are absolute values, and determining that there is motion at the object pixel when a sum of the absolute values is equal to or greater than a first threshold value.

20. The method of claim 16, wherein during the motion detection, when determined that there is no motion at the object pixel, the object pixel is interpolated by setting the value of the object pixel to a value of a corresponding pixel of the preceding field image.

21. The method of claim 16, wherein during the direction determination, when a difference between the values of the pixels along the scan lines above and below the object pixel is less than a predetermined threshold value, the direction in which the object pixel is to be interpolated is determined as a vertical direction.

22. The method of claim 16, wherein during the direction determination, when a difference between the values of the pixels along the scan lines above and below the object pixel is greater than a predetermined threshold value, the direction in which the object pixel is to be interpolated is determined to be a diagonal direction.

23. The method of claim 22, wherein during the direction determination, the direction in which the object pixel is to be interpolated is determined so that a difference between values of a predetermined number of pixels along the scan line above the object pixel and a predetermined number of pixels along the scan line below the object pixel are minimized.

24. The method of claim 16, wherein the direction determination comprises:

computing a first differential value between pixels of the interlaced field image along scan lines above and below the object pixel in a first diagonal direction;

computing a second differential value between the pixels of the interlaced field image along the scan lines above and below the object pixel in a second diagonal direction;

computing a third differential value between the first and second differential values and comparing the third differential value with a predetermined threshold value; and when the third differential value is determined to meet the predetermined threshold value, determining the direction in which the object pixel is to be interpolated using a smaller of the first and second differential values.

25. The method of claim 24, wherein the determining of the direction in which the object pixel is to be interpolated determines that the direction in which the object pixel is to be interpreted is a diagonal direction according to the smaller of the first and second differential values when the third differential value meets a predetermined threshold value and determines the direction in which the object pixel is to be interpolated is a non-diagonal direction when the third differential value does not meet the predetermined threshold value.

26. The method of claim 16, wherein during the spatial interpolation, the object pixel is interpolated using a 6-tap filter when the determined direction is a vertical direction.

27. The method of claim 16, wherein during the spatial interpolation, the object pixel is interpolated in a diagonal direction using a 2-tap filter when the determined direction is not a vertical direction.

28. The method of claim 16, wherein the preceding field images are two field images temporally preceding an input interlaced field image, and the following field images are two field images temporally following the input interlaced field image.

29. A method of converting an interlaced field image into a progressive frame image by interpolating the interlaced field image, comprising:

detecting, using at least one processing device, motion at an object pixel of the interlaced field image, using preceding and following field images;

determining a direction in which the object pixel is to be interpolated when motion at the object pixel is detected using values of pixels along scan lines where the object pixel is not located;

spatially interpolating the object pixel according to the determined direction; and selectively resetting a value of the object pixel using corresponding pixels of the preceding and following field images and another value obtained by the spatially interpolating of the object pixel based on the object pixel being determined to contain high-frequency components in a vertical direction., wherein during the value resetting, the value obtained by spatially interpolating the object pixel is multiplied by a first weight, values of corresponding pixels of the preceding and following field images are multiplied by a second weight, combining results of the multiplication, dividing the combined result by a predetermined constant, and resetting the value of the object pixel to the result of the division.

30. A non-transitory computer readable storage medium structure comprising computer readable code to control a computer to implement an image conversion method, wherein the image conversion method comprises:

detecting motion at an object pixel of an input field image, using preceding and following field images;

determining a direction in which the object pixel is to be interpolated using values of pixels along scan lines where the object pixel is not located when motion in the object pixel is detected;

spatially interpolating the object pixel according to the determined direction; and resetting a value of the spatially interpolated object pixel using corresponding pixels of the preceding and following field images and another value obtained by the spatially interpolating the object pixel, based on a determination that the spatially interpolated object pixel contains high-frequency components in a vertical direction.

31. A method of converting an interlaced field image into a progressive frame image by interpolating the interlaced field image, comprising:

detecting, using at least one processing device, motion at a to-be-interpolated object pixel for an interpolated progressive frame distinct from pixels from the interlaced field image projected onto the interpolated progressive frame, using preceding and following interlaced field images;

determining a direction in which the object pixel is to be interpolated when motion at the object pixel is detected using values of pixels along scan lines of the interpolated progressive frame where the object pixel is not located;

spatially interpolating the to-be-interpolated object pixel according to the determined direction; and selectively setting a value of the spatially interpolated object pixel using corresponding pixels of the preceding and following interlaced field images and another value obtained by the spatially interpolating of the to-be-interpolated object pixel, based on a determination that the spatially interpolated object pixel contains high-frequency components in a vertical direction.

* * * * *

UNITED STATES PATENT AND TRADEMARK OFFICE
CERTIFICATE OF CORRECTION

| | | |
|---|---|---|
| PATENT NO. | : 7,808,553 B2 | Page 1 of 1 |
| APPLICATION NO. | : 10/961478 | |
| DATED | : October 5, 2010 | |
| INVENTOR(S) | : Hye Yun Kim et al. | |

It is certified that error appears in the above-identified patent and that said Letters Patent is hereby corrected as shown below:

Column 11, Line 64, In Claim 17, after "16" insert --,--.

Column 13, Line 30 (Approx.), In Claim 29, delete "direction.," and insert --direction,--, therefor.

Signed and Sealed this
Third Day of May, 2011

David J. Kappos
*Director of the United States Patent and Trademark Office*